United States Patent [19]
Jones et al.

[11] 3,746,403
[45] July 17, 1973

[54] HYDRAULIC BRAKES

[75] Inventors: Roger D. Jones, Ramsey, N.J.; Peter B. Burnham, Columbus, Ohio

[73] Assignee: Abex Corporation, New York, N.Y.

[22] Filed: Oct. 4, 1971

[21] Appl. No.: 185,958

[52] U.S. Cl.................... 303/89, 188/170, 188/265
[51] Int. Cl............................................. B60t 17/16
[58] Field of Search......................... 188/265, 170; 303/89; 92/23, 24, 27, 28

[56] References Cited
UNITED STATES PATENTS

| | | | |
|---|---|---|---|
| 3,575,087 | 4/1971 | Sherwood | 188/170 X |
| 3,680,666 | 8/1972 | Sommer | 188/170 |
| 3,251,278 | 5/1966 | Royster | 92/24 X |
| 3,294,455 | 12/1966 | Valentine | 303/89 X |
| 3,228,729 | 1/1966 | Schubert | 303/9 |
| 3,425,221 | 2/1969 | Canfield | 60/54.5 |
| 3,550,731 | 12/1970 | Roselius et al | 188/153 |
| 3,508,794 | 4/1970 | Engle | 303/10 |

Primary Examiner—Allen N. Knowles
Assistant Examiner—Gene A. Church
Attorney—James B. Kinzer et al.

[57] ABSTRACT

A brake is applied by a fluid under pressure, the establishment of sufficient pressure to apply the brake being visably indicated. Mechanical means for holding the brake in its engaged position is actuated or energized upon slight expansion of a spring member which is part of the system for transmitting the brake force; the spring is allowed to expand, after the brake is engaged, by a purposeful bleed in the fluid system. If the mechanical lock fails to hold, a visual indication is given of this failed event. While the brake is held engaged mechanically, it is released by fluid under pressure.

11 Claims, 6 Drawing Figures

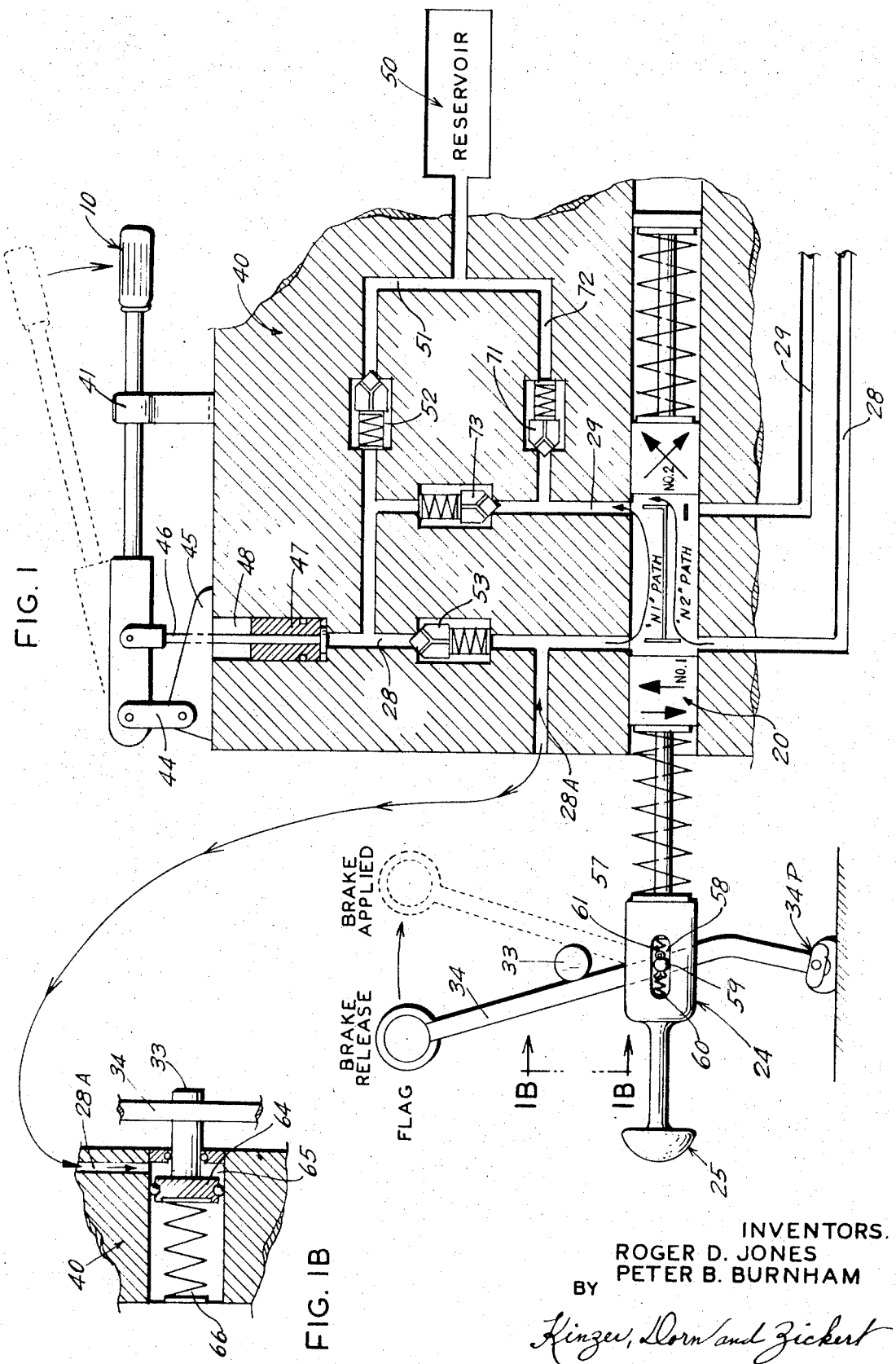

INVENTORS.
ROGER D. JONES
PETER B. BURNHAM
BY
Kinzer, Dorn and Zickert
ATTORNEYS

HYDRAULIC BRAKES

This invention relates to a hydraulic brake for a vehicle, and in particular one for use as a hand brake on a rapid transit train system.

The present invention is concerned specifically with an emergency brake, hydraulically operated, for installation in the car of a rapid transit system in compliance with certain functional requirements constituting the objects of this invention, but the brake may be used as well in other vehicles where the objectives of the invention may be usefully applied. Thus the objects of the present invention are to develop a hydraulic hand brake system which (1) is held engaged mechanically and therefore does not depend upon the maintenance of hydraulic pressure to hold the brake applied once it is applied (2) incorporates signal devices effective to "announce" the application of sufficient hydraulic pressure to apply the brake and the attainment of a combination of engaged or set brake signals only in the event the brake is in fact held mechanically in the brake engaged position and (3) shall be disengaged or released only by hydraulic pressure.

More specifically, the objects of the present invention are to initially set a brake by hydraulic pressure established through movement of a pump handle but to hold the brake engaged by mechanical means; to actuate an indicator from a "brake release" to a "brake applied" position (and vice versa) only in the event hydraulic pressure is applied as it should be; and to assure that the pump handle will be instantly sprung from its "brake applied" position in the event the mechanical latch fails to perform.

The foregoing objects are attained, in the specific hand brake construction, by commencing operation upon movement of a selector valve to a brake apply position whereupon a pump lever is operated to manually build up pressure sufficient to operate a piston which permits a visual indicator to move to "brake applied" position after pressure has become sufficient to apply the brake. After movement of the indicator, operation of the pump lever is discontinued; the pump lever is restored to "home" or stowed position, and hydraulic pressure is reduced by releasing the selector knob. The brake is held engaged by a mechanical lock, but if the mechanical lock does not hold, the pump lever is dislodged from its home position as a visual indication of a failed condition. On the other hand, to release the brake, the selector is shifted to a brake release position; and the pump lever is operated until the aforesaid indicator moves from the brake set position to its "brake released" position.

Other and further objects of the present invention will be apparent from the following description and claims and are illustrated in the accompanying drawings which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention.

In the drawings:

FIG. 1 is a fragmentary sectional view, partly schematic of apparatus embodying thee present invention;

FIGS. 1A and 1B are fragmentary sectional views of extensions of the structure shown in FIG. 1, FIG. 1B being taken on the line 1B—1B of FIG. 1;

GENERAL DESCRIPTION

Figure 1A:
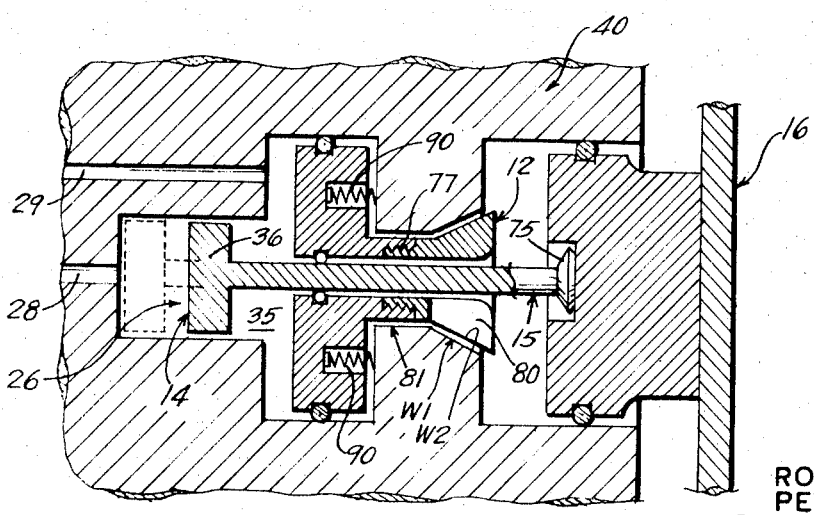

Details of the hand brake of the present invention are set forth in FIGS. 1, 1A and 1B. The brake is both set and released by the application of hydraulic pressure through operation of a pump handle 10, FIG. 1, but the brake is held in its set or brake engaged position by a mechanical lock 12, FIG. 1A. It may be noted at the outset that certain parts in FIG. 1A are shown in the brake engaged position; at least this is so with regard to the piston 14 and the associated piston rod 15, FIG. 1A, which have moved the brake head structure 16 to its advanced, brake engaged position.

A four-way valve 20 shown by conventional symbology in FIG. 1 normally occupies the neutral position shown. At the commencement of operation, setting the brake manually, a valve selector 24 is shifted to the right as viewed in FIG. 1 by hand pressure applied to its knob 25. This is accomplished through a lost motion connection as will be described in detail, allowing hydraulic fluid to be pumped under pressure through line 28 into a chamber 26, FIG. 1A, incidental to moving the piston 14 to the brake engaged position. Concurrent with positioning the four way valve 20, the pump handle 10, FIG. 1, is moved upward from its stowed position to the dotted line position and then given a return stroke to supply hydraulic pressure for setting the brake. This motion is repeated, if necessary, to supply sufficient fluid under pressure to engage the brake.

During return movement of the pump handle, back toward its stowed position as the brake is being set, hydraulic pressure is effective in line 28A to withdraw a pin 33, FIGS. 1 and 1B, from a blocking position relative to a flag-type indicator rod 34 which then flops over to the dotted line position shown in FIG. 1 characterizing a brake engaged condition. The flag rod 34 is pivoted at 34P for swinging movement; this movement is shown as beginning from a full line position, FIG. 1, to the "brake release" position which is maintained momentarily even though the four-way valve may have been set as aforesaid. However, as will be described, the flag rod will not shift to its brake applied position if there is failure to establish hydraulic pressure when the pump handle is operated.

On the other hand, when the indicator flag moves to the brake applied position, the operator knows that hydraulic pressure for setting the brake has indeed been pumped to chamber 26, and when this occurs the operator stows the pump handle and then releases pressure from knob 25 allowing the four-way valve to re-center to its neutral position. Because of provision for controlled leakage in chamber 26 as hereinafter described, pressure will have reduced in lines 28 and 28A, and pin 33 will have been restored to its blocking position, abutting rod 34. This time it holds rod 34 in the brake applied position.

As noted above, the brake is to be held engaged by the mechanical device 12, but if the mechanical device fails to grab, and with the four-way valve re-centered as shown in FIG. 1, pressure in chamber 26 is effective as hereinafter described to dislodge the pump handle from its stored or home position representing a visual indication of a failure.

The brake is released by displacing knob 25 to the left, FIG. 1, setting the four-way valve in its No. 2 position. The pump handle is reciprocated; fluid under pressure is pumped through line 29 into chamber 35, FIG. 1A, and is there applied to a brake release piston 36 incidental to releasing the mechanical lock 12 as hereinafter described. Concurrently, fluid under pressure in chamber 35 presses against piston 14 moving it to its dotted line position, FIG. 1A. Subsequent pressure build-up in line 28A again releases pin 33; rod 34 thereupon moves from its brake engaged position to its brake released position. The four-way valve is allowed to re-center after the pump handle 10 is stowed.

DETAILED DESCRIPTION

The development of the hand brake of the present invention was prompted by requirements for a metropolitan rapid transit system and hence the equipment including the selector 24, the handle 10 and the block structure 40 which houses valve 20, the reservoir for hydraulic fluid, and associated conduits and check valves will be installed at a convenient location in the passenger cars. However, the present invention may be applied to vehicles of other form.

The pump handle normally is stowed at home position in a clip 41, readily available to the operator. The handle is pivotally supported by a link 44 in turn supported by a bracket 45 fixed to the housing or block 40.

The handle 10 operates a rod 46 having a pump piston 47 secured thereto. The piston 47 is disposed in a pump chamber 48, and pump chamber 48 communicates with a reservoir 50 via conduit 51 having a check valve 52 (2 psi cracking pressure) interposed therein.

Conduit 28, at the end opposite chamber 26 already described, terminates at the pump chamber 48.

When the pump handle 10 is moved upward, its piston 47 is raised and the displacement volume in pump chamber 48 is filled with hydraulic fluid drawn from chamber 50, and possibly chamber 35 as well, as permitted by the check valves 52 and 73.

On the return or downward stroke, piston 47 moves downward in chamber 48 and fluid under pressure in conduit 28 moves past check valve 53 (2 psi crack pressure) through valve 20 in its No. 1 position and into piston chamber 26. After sufficient fluid has been pumped, at the end of a return stroke, handle 10 is stored in clip 41.

However, the preliminary operation, preliminary to movement of the handle 10 as thus described, is to shift and hold the spool of the four-way valve 20 to its No. 1 position to open conduit 28 for the passage of fluid under pressure from the pump chamber 48 to the chamber 26 which houses the brake applying piston 14. This is accomplished, as mentioned above, by hand pressure applied to knob 25 of valve selector 24, noting that the four-way valve is of the spring-centered type.

The head 57 of the selector is provided with an opening 58. The flag rod 34, intermediate its ends, is provided with a pin 59 disposed in the opening 58. A pair of coil springs 60 and 61 are confined iin the opening 58 and the adjacent ends thereof bear against opposite sides of pin 59. This establishes a so-called lost motion connection allowing the selector head 57 to be shifted, to shift the spool of the four-way valve, in spite of the fact that the flag rod 34 is locked in its brake release position by the lock pin 33.

If the valve 20 is properly positioned to open conduit 28 to the passage of fluid under pressure to chamber 26, then means are effective to dislodge pin 33 relative to its blocking position as to the flag rod 34. In achieving this, pin 33, FIG. 1B, is provided with a piston head 64 located in a chamber 65 so that the pin 33 normally interdicts the path along which rod 34 is adapted to swing. Passage 28A communicates with passage 28 as shown. Therefore, with the operator holding the four-way valve 20 in its No. 1 position and as he swings the handle 10 to supply hydraulic pressure to chamber 26, the same pressure established in chamber 26 is established in chamber 65. As sufficient and predetermined pressure is attained to properly apply the brake, pin 33 is displaced and the indicator arm 34 moves to its brake applied position. It is therefore a criterion that the force of spring 66 exerted on piston 64 be greater than the minimum pressure required to set the brake, so that when the brake applying pressure is established in chamber 26, rod 34 will flop over to "announce" the event.

If perchange the valve 20 is defective or not completely moved to No. 1 position, any fluid under pressure in conduit 28 follows "N" path (neutral) to conduit 29, and from conduit 29 past a check valve 71 (30 psi crack pressure) in conduit 72 which leads back to the reservoir 50. The pin 33 will not be displaced and flag arm 34 will not shift.

Conduit 29 extends to conduit 51 as shown in FIG. 1, and a check valve 73 is interposed, having a crack pressure of 2 psi. Therefore valve 73 will open prior to the opening of valve 71.

Should piston 14 not remain in the brake applied position (through some failure in the mechanical lock 12 when the Belleville spring 75, hereinafter described is compressed) the pump handle 10, having been stowed in clip 41, and knob 25 having been released to its neutral position, pump handle 10 will be dislodged from clip 41 by the resultant pressure, say 30 psi, acting on the pump piston. This is so because, with valve 20 centered in neutral position, displacement of piston 14 by compressed spring 75 causes back pressure in chamber 26 and line 28 which will follow "N" path, opening valve 73. Fluid under pressure is delivered to the pump chamber 28, raising piston 47 and causing the pump handle to "pop" from its clip thereby "announcing" that the brake is not set.

HOLDING THE BRAKE IN SET POSITION

Referring to FIG. 1A, contact between the brake head structure 16 and the brake actuating rod 15 is by way of a spring member, specifically a Belleville spring 75 fastened to the end of rod 15 opposite its piston head 14. The piston rod 15 is extended through a sealed aperture in in the brake release piston 36. Piston 36 is provided with a collar 77 to which is threadedly attached a conventional collet 80 (a split, segmented cone) having an aperture through which rod 15 extends.

The portion of block 40, in which the mechanical lock structure 12 is located, is formed with an internal cavity defined by a circular wall 81 which receives the collar 77. The wall 81 has an extension presenting a cone-shaped housing expanded in the direction of the brake member and affording a wedge wall W1; the exterior of the collet 80 is nested therein, being complemental thereto and affording a second wedge wall W2. Friction between wedges W1–W2 is less than that between rod 15 and collet 80. Normally the walls W1 and W2 are engaged and collet 80 is in friction contact with rod 15; we show separation to facilitate understanding.

Piston head 14 is only labyrinth-sealed relative to its chamber 26, allowing for a slow bleed of fluid therepast from chamber 26 into chamber 35 associated with the brake release piston 36. The brake force is applied through a spring member as 75 to compensate for thermal effects or other circumstances that may result in slack to be taken up by the spring 75 upon expansion thereof. Therefore when the brake is actuated to force the friction member against the car wheel, Belleville spring 75 is compressed. Now then, when fluid under pressure in chamber 26 bleeds into chamber 35 with the brake engaged, there is loss of pressure in chamber 26, although full fluid volume remains, and spring 75 expands. The collet-to-piston rod (80–15) friction is positive and self-energizing, moving the collet leftward with the piston rod 15 when spring 75 expands, as viewed in FIG. 1A, so forcefully seating wedge walls W1 and W2 as to produce effective constriction of the collet tightly about the piston rod, holding the brake engaged. With the brake locked in its engaged position, there is no pressure acting on the pump piston 47 tending to unseat or dislodge the stowed pump handle. The operator is accordingly informed of an accomplished mission.

On the other hand, if the brake head 16 is moved to its engaged position but the mechanical lock fails, then the Belleville spring 75 has expanded all the way so to speak, returning piston 14 which creates back pressure in chamber 26, dislodging the pump handle 10 and warning the operator that the brake has failed.

RELEASING THE BRAKE

Referring to FIG. 1A, and assuming that the collet has been so tightly constricted on rod 15 to hold the brake engaged, it will be readily recognized that by shifting the brake release piston 36 to the right, the wedge walls W1 and W2 will tend to separate. This releases the lock and at the same time the brake pressure applying piston 14 is moved to the direction of its dotted line position.

The brake release piston 36 is biased by a plurality of springs 90 which are of sufficient strength normally to engage the wedge walls and constrict the collet on rod 15. The springs 90 will be compressed upon delivery of fluid under high pressure into chamber 35, such delivery being through conduit 29.

To release the brake, the operator moves knob 25, FIG. 1, to shift the spool of the four-way valve 20 leftward, position No. 2. This is permitted by the lost motion connection 6–61 even though pin 33, at this time, blocks rod 34 holding it in the brake engaged position. Concurrently with movement of the selector 24 leftward as viewed in FIG. 1, the pump handle is reciprocated, pumping hydraulic fluid from the pump chamber 48 through passage 28 past the check valve 53, into cross passage 28A and into conduit 29.

As a consequence, fluid under pressure is delivered to the chamber 65. After complete retraction of piston 14 to the dashed line position in chamber 26, pressure will become sufficient to shift the pin piston 64 to the left, FIG. 1B, against the return action of spring 66, withdrawing pin 33 from its blocking position relative to the signal rod 34 which thereupon shifts to its normal or brake release position shown by full line in FIG. 1. The operator then stows the pump handle and releases selector 24, allowing valve 20 to center. Prior to this movement of rod 34, fluid under pressure in conduit 29 is delivered to the chamber 35. The mechanical lock 12 is effective and piston 14 remains stationary. However, the instantaneous action is that fluid under pressure bearing against the exposed face of piston 36 nudges piston 36 to the right against the return action of springs 90 and concurrently walls W1 and W2 tend to disengage which has the effect of opening the collet 80. Now, the piston rod 15 is released from collet 80 and fluid under pressure acts on the rear face of piston 14 exposed to chamber 35. Piston head 14 is then moved to the left disengaging the brake. Since the collet is open, piston rod 15 is not gouged or abraded. Fluid in chamber 26 flows to the left, FIGS. 1 and 1A, and with valve 20 in its neutral position this fluid follows "N2" path back through valve 71 to the reservoir.

There is a dividend in the use of a spring to in effect couple the piston rod 14 to the brake head structure. Thus, if the brake is a disc brake and if the disc is hot when the brake is engaged, there might be a slight contraction as the brake cools on standing, sufficient to release the brake by thermal phenomenon. However, if there is shrinkage or contraction of the brake head structure away from the piston rod 15, any slack of the order thus encountered will be taken up by a counter expansion of the Belleville spring 75.

RECAPITULATION

It will be seen from the foregoing that fluid under pressure admitted to the first brake chamber, chamber 26, applies the brake in the sense that the brake member 16 is moved toward the part to be decelerated, and when brake engagement is established, spring 75, interposed between the piston rod 15 and the brake member 16, will be compressed. Having applied the brake pressure, movement of the pump handle is ceased and it is stowed in the clip 41. Fluid leaks from the chamber 26 into chamber 35, and as a consequence spring 75 will expand slightly, tending to move the piston rod 15 in the brake released direction. Piston 36 to which the collet 80 is attached is at rest in its normal position, which is to say that the spring means 90 bias piston 36 to its normal position where it is effective to nest the collet 80 in its housing with the wedge walls W1 and W2 in mere touching engagement without actually setting or engaging the lock.

However, the event of expansion of spring 75 immediately after brake engagement is to shift piston rod 15 in the brake released direction which is accompanied by instantaneous forcing action on the collet bringing the wedge walls W1 and W2 into forced, energized contact, characterizing an engaged lock with the collet constricted tightly about the piston rod thereby holding the reciprocal piston rod in the brake engaged position.

It will be recognized that the Belleville spring 75 attached to the end of the piston rod 15 opposite the piston head 14 undergoes no compression until the brake member encounters the resistance of the part to be retarded. One essential function of the spring 75 is to take up any slack that may be encountered after the brake is engaged, but it will be seen that under the present invention the spring 75 is advantageously employed as a means for engaging the mechanical lock 12. Such locking function occurs as an incident to a loss of pressure in chamber 266, just enough to allow spring 75 to expand that slight amount characterized by constriction of the collet 80.

The second brake chamber for receiving fluid under pressure, chamber 35, is assigned the brake release function. Consequently, chamber 35 is located on the right side of piston 14 and is in communication with the rear of piston 14. The brake release piston head, head 36, is located in chamber 35 and is employed to disengage the lock 12 as an incident to delivery of fluid under pressure to chamber 35. Thus, when fluid under pressure is admitted to the second chamber it is effective on the rear of piston head 14 and on the front of piston 36, tending to spread the two pistons. However, because of the area differentials, piston head 36 is first actuated against the resistance of its return springs 90. Since the collet 80 is attached to the piston head 36 the collet 80 moves with the latter, separating wedge walls W1 and W2 and characterizing disengagement of the lock. In this fashion, the collet is in effect loosened relative to piston rod 15 and hence will not damage the piston rod as fluid under pressure is effective on the rear face of the piston 14 to release or disengage the brake.

Fluid under pressure is developed by the pump lever 10 which reciprocates piston 47 in the pump chamber 48. Fluid under pressure as thus developed is delivered to either the first or the second brake chamber depending upon selective movement of valve 20 respectively to its No. 1 or No. 2 set position, on either side of the neutral position. When valve 20 is in its neutral position, as shown, any fluid under pressure developed in chamber 48 is circulated without effect.

Positioning of valve 20 in its No. 1 set position tends to shift the indicator rod from its restored to its "brake applied" indicating position, but such movement is resisted, and in fact blocked, by the latch pin 33 which is withdrawn, allowing the indicator to move, only in the event that chamber 65 "registers" the prevelance of fluid under sufficient pressure to apply the brake. When this event is registered or indicated, the operator releases valve 20 to its neutral position and the pump handle is stowed in the clip 41. If the mechanical lock does not hold, back pressure is delivered to pump chamber 48 through valve 20 standing in its neutral position and handle 10 is ejected from its stowed position.

The brake is released by re-establishing pressure in pump chamber 48 and setting valve 20 in its No. 2 position.

Interlocking means between the pump handle and the flag mechanism can provide a neutral or hidden flag at any time the pump handle is removed from its stowed position, or even when the pump handle is not properly stowed prior to release of the selector valve knob 25, thereby to prevent an erroneous "set" or "release" indication when the reality is only a partially completed operation.

Figure 2:
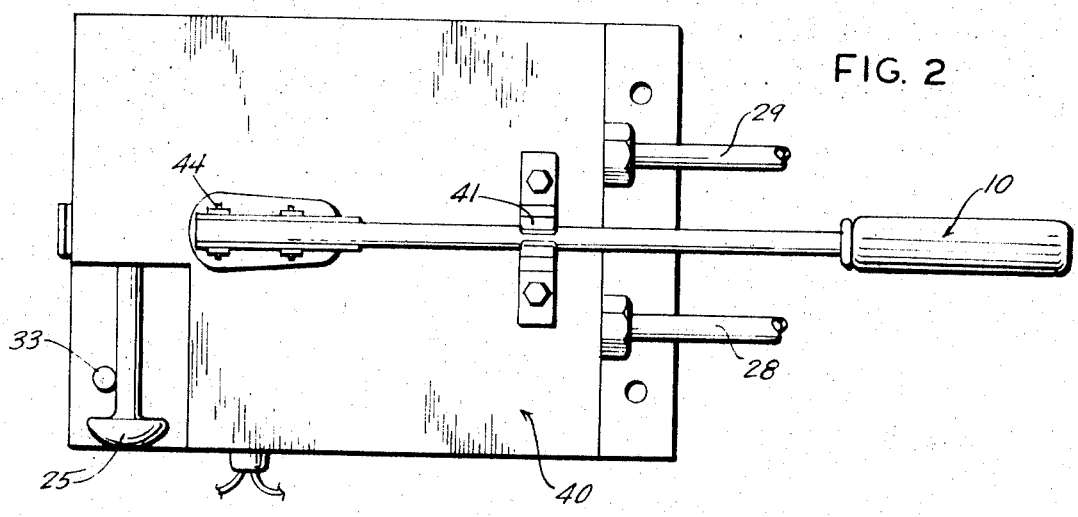
FIG. 2 is a plan view of a housing incorporating the present structure.
Figure 3:
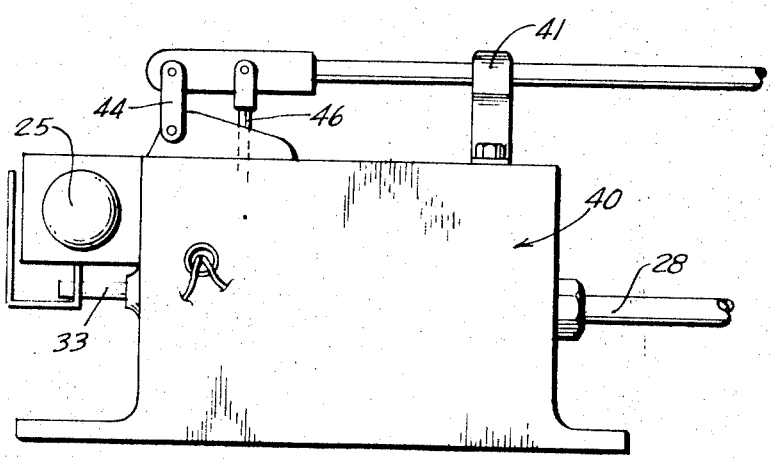
FIG. 3 is an elevation of the housing shown in FIG. 2.
Figure 4:
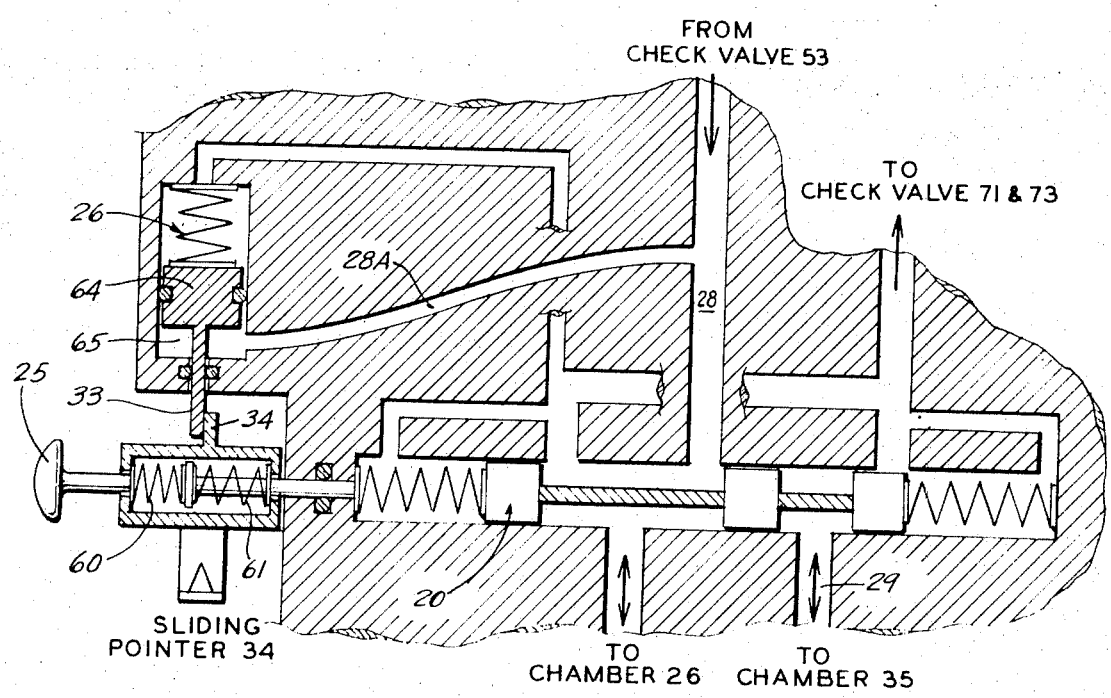
FIG. 4 is a detail view of a four-way valve.

The operation of the four-way valve should be clear enough from what is shown in FIG. 2, where standard symbology is employed, but nonetheless a more detailed section is shown in FIG. 4 where clearances are again exaggerated to show separate parts. The indicator 34, FIG. 4, is shown in the brake applied position while the valve spool and knob 25 are shown in the relaxed or normal position.

We claim:

1. Brake apparatus operable by fluid under pressure and comprising a brake member movable to a brake engaged position where it engages the part to have the brake force applied thereto, a reciprocal piston rod for moving said brake member to and from its engaged position, said piston rod having at one end a piston head disposed in a first chamber to which fluid under pressure may be delivered to move the piston rod in a brake engaged direction, spring means interposed between the opposite end of the piston rod and the brake member so that movement of the piston rod in the brake engaged direction is transmitted to the brake member by said spring means, the spring being compressed as the brake member encounters the part to be retarded whereby the spring means may expand to take up slack that may prevail after the brake is engaged, and after corresponding piston rod movement ceases a lock for applying a holding force to the piston rod to hold the brake in its engaged position, means to engage the lock as an incident to slight expansion of said spring means, and means allowing for a leak of fluid pressure from said first chamber whereby a reduction of pressure in said chamber is accompanied by expansion of said spring means to engage the lock.

2. Brake apparatus according to claim 1 in which the lock comprises a collet frictionally surrounding the piston rod so that the collet moves with the piston rod when the latter is shifted by the expanding spring means, a housing embracing the collet and together having engageable wedge surfaces which constrict the collet tightly about the piston rod to hold the brake engaged when the piston rod is so shifted.

3. Brake apparatus according to claim 2 having a second chamber in communication with the rear of said piston head for receiving fluid under pressure to move the piston head in a brake releasing direction, and means responsive to the delivery of fluid under pressure to the second chamber to disengage the wedge surfaces.

4. Brake apparatus according to claim 3 in which the last named means is a second piston head disposed in the second chamber, said collet being an extension of said second piston head and spring means acting on said second piston head tending to seat the wedge surfaces.

5. Brake apparatus according to claim 4 in which fluid under pressure is developed by a pump lever which reciprocates a piston in a pump chamber, fluid under pressure being delivered to said chambers selectively upon movement of a selector valve to either side of a neutral position.

6. Brake apparatus according to claim 5 in which an indicator normally resides at a position indicating that the brake is released but is displaced from said normal position as an incident to delivery of fluid under pressure to said first chamber.

7. Brake apparatus according to claim 5 in which the valve is returned to neutral position and the pump lever is set in a stowed position after an effective stroke of the pump lever, and means developing back pressure in said pump chamber for displacing the pump lever from stowed position in the event the lock fails.

8. Brake apparatus according to claim 7 in which an indicator normally resides at a position indicating that the brake is released but is displaced from said normal position as an incident to delivery of fluid under pressure to said first chamber.

9. Brake apparatus comprising a brake member movable to a brake engaged position by fluid under pressure, a lock for holding the brake in its engaged position, a manually operable pump including a pump lever operating a piston in a pump chamber for developing fluid pressure to operate the brake, a stowed position to be occupied by the lever after operating the lever, an indicator movable from a restored to a set position upon establishment of sufficient fluid pressure to apply the brake, and means for ejecting the lever from stowed position in the event the lock fails.

10. Brake apparatus acccording to claim 9 in which fluid under pressure for engaging the brake is delivered to one brake chamber and in which fluid under pressure for releasing the brake is delivered to another brake chamber, a manually settable selector valve having first and second set positions assigned respectively to delivery of fluid under pressure from the pump chamber to one or the other of said brake chambers, said valve having a neutral position in which fluid under pressure is circulated without effect, said indicator tending to be moved to its set position upon movement of the selector valve to its first position but being restrained by a latch, and means releasing said latch as an incident to delivery of fluid under pressure to said first brake chamber.

11. Brake apparatus according to claim 10 in which the valve is restored to neutral position after the indicator has moved, said valve in neutral position delivering back pressure to said pump chamber, ejecting the pump lever from stored position, in the event the lock fails to hold.

* * * * *